United States Patent

[11] 3,611,231

[72] Inventor Claire E. Burke
 Keyport, N.J.
[21] Appl. No. 877,343
[22] Filed Nov. 17, 1969
[45] Patented Oct. 5, 1971
[73] Assignee The United States of America as
 represented by the Secretary of the Army

[54] Q-SWITCHED FREQUENCY DOUBLING LASER
 8 Claims, 2 Drawing Figs.

[52] U.S. Cl. .................................................. 331/94.5,
 350/160
[51] Int. Cl. ................................................. H01s 3/10
[50] Field of Search ..................................... 331/94.5;
 350/147, 150, 157, 160

[56] References Cited
 UNITED STATES PATENTS
 3,497,828 2/1970 Telk et al. ..................... 331/94.5

OTHER REFERENCES

Burns et al., Laser Action in LiNbO$_3$. IBM Tech. Discl. Bul., Vol. 9, No. 7 (December 1966) pp. 871 & 872.

Infrared Laser Output Up-Converted by New Nonlinear Crystal to High-Power, C-W Green Light. Laser Focus, (Feb. 1968) pp. 16 & 18.

*Primary Examiner*—William L. Sikes
*Attorneys*—Harry M. Saragovitz, Edward J. Kelly, Herbert Berl and Daniel D. Sharp ABSTRACT: This invention relates to a Q-switched laser wherein a single nonlinear optical crystal positioned in a laser cavity performs both the functions of Q-switching and frequency multiplication.

INVENTOR.
CLAIRE E. BURKE

BY: Daniel D. Sharp
Harry M. Saragovitz,
Edward J. Kelly &
Herbert Berl   ATTORNEYS.

Q-SWITCHED FREQUENCY DOUBLING LASER

The invention described herein may be manufactured, used and licensed by or for the Government for governmental purposes without the payment to me of any royalty thereon.

BACKGROUND OF THE INVENTION

In order to increase the power output of a laser at the laser frequency, it is common practice to use one of several well-known Q-switching techniques. One of the most widely used of such techniques is the electro-optical method, since electro-optic cells and crystals are readily controllable electronically and are particularly adapted for digital transmission. One type of electro-optical Q-switching uses a nonlinear crystal, such as potassium dihydrogen phosphate, used in conjunction with an analyzer. The orientation of the crystal is such that, for a polarized laser beam, when an electric field is applied to the crystal, the polarization of the laser beam is rotated in passing through said crystal. The beam polarization, after rotation, is such that the beam cannot pass through an analyzer interposed between the crystal and the cavity mirror. The multiple reflections of the laser beam between cavity mirrors thus is prevented and the Q of the laser cavity is said to be switched or spoiled. When the electric field is removed from the crystal, however, the laser beam passing through the crystal is at the proper polarization to pass through the analyzer and impinge upon the laser cavity mirror, whereupon laser oscillations may be maintained.

In some laser applications, it is also necessary to multiply the basic operating frequency of the laser in order to provide a more appropriate wavelength for transmission and detection. For example, the frequency of a laser operating normally within the infrared region of the spectrum, as at 1.06 microns, can be doubled so as to emit in the visible (green) region of the spectrum where more sensitive detectors are readily available.

In previous applications where lasers make use of both Q-switching and frequency multiplication techniques, separate devices have been used for each of these functions. The laser cavity then contains two crystal components, namely, the Q-switching crystal and the frequency multiplying crystal. Crystals used for the above purposes are difficult to obtain in high optical quality. The use of two such crystals not only increases losses owing to reflections at each surface and scattering at optical inhomogeneities in the material, but also increases the difficulty of aligning the cavity resonator structure.

SUMMARY OF THE INVENTION

In accordance with the invention, it is possible to eliminate one of these crystals from the laser cavity, thereby minimizing alignment problems, decreasing cavity size and eliminating the losses inherent in one of the crystals. By proper choice of crystal, it may be possible to direct the harmonic of the fundamental laser beam, thereby allowing use of a more efficient reflecting mirror.

DETAILED DESCRIPTION OF THE PREFERRED EMBODIMENT

Figure 1:
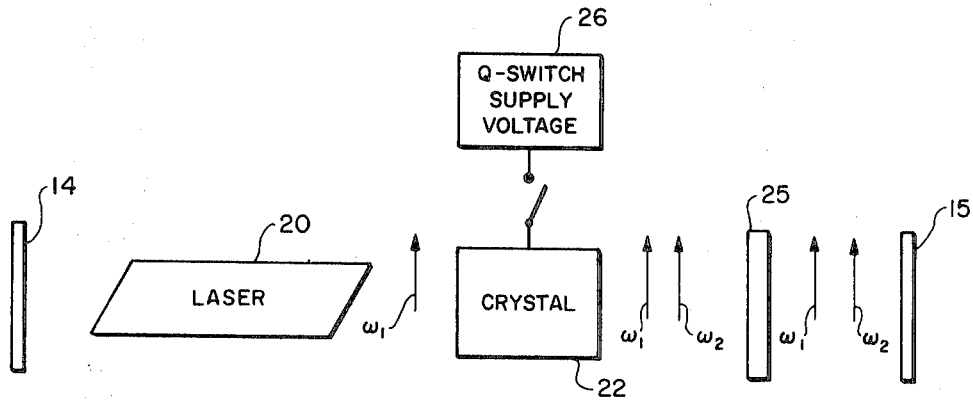
FIG. 1 is a diagram illustrating a laser device according to the invention in which the plane of polarization of the fundamental and second harmonic of the optical beam emanating from the nonlinear optical crystal are the same.
Figure 2:
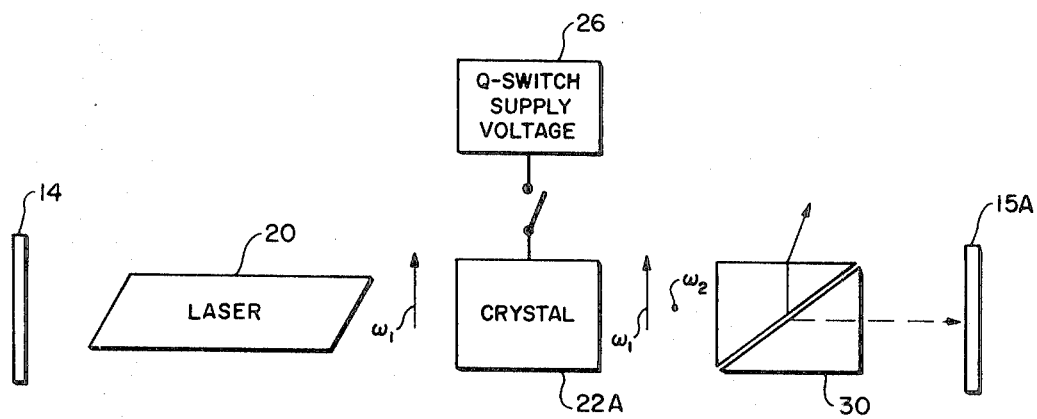
FIG. 2 is the diagram of a laser device similar to that of FIG. 1 but having an optical crystal of the type in which the plane of polarization of the fundamental is displaced from the plane of polarization of the second harmonic.

In referring to FIGS. 1 and 2 of the drawing, the elements of these figures which can be used interchangeably are indicated by the same reference numeral. The nonlinear optical crystal of FIG. 2 is a different class of crystal than that of FIG. 1 and is indicated by the same reference numeral as in FIG. 1 with the addition of the suffix A. Similarly one of the end mirrors in FIG. 2 preferably has a different reflectivity than the corresponding mirror in FIG. 1 and is distinguished by use of the suffix A following the reference numeral.

The laser 10 of FIG. 1 includes the usual cavity resonator defined by two mirrors 14 and 15 which are spaced by some multiple of the wavelength of operation of the laser. In the embodiment of FIG. 1, the mirror 14 is designed for substantially 100 percent reflectivity while the other mirror 15 is designed to transmit a portion of the laser beam, in the usual manner. In addition to the active laser medium 20 which, for example may be a neodymium glass rod, the laser cavity contains a nonlinear optical crystal 22 and an analyzer 25. The laser medium 20, crystal 22 and analyzer 25 must be properly aligned for optimum operation. The laser rod 20 can be made to provide a polarized optical beam by proper geometrical configuration of the laser rod. Alternately, the laser may emit a nonpolarized beam which is passed through an auxiliary polarizer, not shown. In either case, the laser beam, before impinging upon the nonlinear optical crystal 22 is polarized beam, as indicated by the arrow labeled $\omega_1$. The crystal 22 is provided with electrodes to which a source of potential 26 can be supplied at selected intervals to provide an electric field suitable for Q-switching. The laser beam, after passing through crystal 22, is transmitted through the analyzer 25 adapted to transmit only optical energy of a predetermined polarization. When the electric field is applied to the optical crystal 22 the plane of polarization of the laser beam is rotated and the beam cannot be transmitted through the analyzer to the cavity mirror 15. This Q spoiling action continues until the electric field is removed, whereupon the plane of polarization of the laser beam is such as to allow passage of the beam emanating from the crystal 22 through the analyzer 25 and the beam can undergo reflection from the mirror 15. A portion of this laser beam passes through the mirror 15, in the usual manner.

It will be noted that the crystal must be oriented properly with respect to both the laser rod 20 and the analyzer 25; the relative position of the crystallographic axis of the crystal 22 and the plane of polarization of the beam emerging from the laser rod will determine the plane of polarization of the beam emerging from the crystal 22 and the latter plane must be aligned with the plane of polarization of the analyzer 25 during periods when the Q-switching field is removed.

The crystal 22 of FIG. 1, in addition to playing a part in the Q-switching operation, also serves to generate a hormonic $\omega_2$ of the fundamental laser frequency $\omega_1$. The nonlinear crystal orientation must be selected so as to allow Q-switching to be obtained when the electric field is applied and to obtain frequency generation when the electric field is removed. The crystal of FIG. 1 is of a symmetry class such as trigonal 3m, which provides an optic beam with the fundamental $\omega_1$ and the second harmonic $\omega_2$ having the same plane of polarization. An example of such a crystal is lithium niobate ($LiNiO_3$). For a crystal of point group symmetry 3m at the phase match temperature, the laser beam impinges upon the crystal and is polarized along the x-axis of the crystal. The beam is travelling in the z-direction (direction of the z crystallographic axis) and, in this case, electrodes are applied to the crystal on its x-y faces, i.e. the field is applied along the x-direction. When the electric field is applied along the x-direction the crystal axes are rotated in the x-y plane and Q-switching is obtained. When the field is removed, the crystal generates the second harmonic polarized along the y-direction, i.e. polarized along the same direction as the fundamental frequency of the laser beam from laser 20. The directions of the plane of polarization for the fundamental and the second harmonic is indicated in FIG. 1 by the arrows designated $\omega_1$ and $\omega_2$, respectively. Both harmonics pass through the analyzer 25, which may be an ordinary polarizer and a portion of the energy in the fundamental and harmonic passes through the partially transmissive mirror 15. If necessary, the fundamental can be separated from the second harmonic by means, not shown, disposed externally of the laser cavity.

Summarizing, when the electric field is applied to crystal 22, a Q-switching action occurs and the multiple reflections from the mirrors 14 and 15, necessary for proper laser operation, cannot arise until the electric field is removed from the crystal 22. When the laser cavity Q spoiling action is thus terminated by removal of the electric field, the crystal 22 acts upon the laser beam from the laser rod 20 to generate an additional (second) harmonic beam $\omega_2$, which then is transmitted through the analyzer 25 and mirror 15.

In FIG. 2 a modification of the system of FIG. 1 is shown in which the nonlinear optical crystal 22A is of a symmetry class orthorhombic $mm2$, which generates a second harmonic, as in the case of the crystal 22 of FIG. 1, but wherein the plane of polarization of the second harmonic $\omega_2$ is orthogonal to the plane of polarization of the fundamental optical beam $\omega_1$. The planes of polarization of the fundamental and second harmonic are indicated by the respective arrow $\omega_1$ and dot $\omega_2$ in FIG. 2. An example of a crystal of the type shown in FIG. 2 is barium sodium niobate ($Ba_2NaNb_5O_{15}$). For example, for a crystal possessing point group symmetry $mm2$ the crystal is aligned with the electric field applied along the $y$ crystallographic axis, the impinging laser beam travels along the $x$ crystallographic axis and the plane of polarization of the impinging laser beam is directed along the $y$ crystallographic axis. With the electric field applied along the $y$-direction the plane of polarization of the laser beam is rotated. Thus with proper orientation of the analyzer Q-switching is obtained. When the field is off, for the incident beam polarized along the $y$-direction, the crystal generates the second harmonic polarized along the $z$ crystallographic axis. An example of such a crystal is $Ba_2NaNb_5O_{15}$ at its phase match temperature of 80° C. to 90° C. This type of crystal operation permits one to direct the second harmonic from the laser along a separate path displaced from the axis of the laser 10, provided one substitutes a Glan-prism 30 for the analyzer 25 of FIG. 1. The Glan-prism 30 is an optical component which directs the second harmonic $\omega_2$ of the optical beam emanating from the crystal 22A in a direction normal to that of the fundamental optical beam $\omega_1$. As indicated by the solid arrow in FIG. 2, the second harmonic beam, after passing through the prism 30, is directed externally of the laser device transverse to the longitudinal axis thereof; the fundamental $\omega_1$ of the optical beam, on the other hand, passes through the prism 30 along the longitudinal axis of the laser device, as indicated by the dotted arrow. This fundamental is reflected from mirror 15 and the multiple laser cavity reflections, necessary for stable operation of the laser, are established. Since the second harmonic optical beam is the beam transmitted externally by the prism, the mirror 15 can be designed for substantially 100° percent reflectivity, with a consequent increase in laser efficiency.

The Glan-prism 30 would have been used as an analyzer in the system of FIG. 1. However, since the crystal 22 of FIG. 1 does not displace the planes of polarization of the fundamental and second harmonic optical beams, there is no need for such a prism and the simpler analyzer 25 of FIG. 1 is preferable for such a system.

What is claimed is:

1. A laser device comprising a pair of spaced energy reflecting means bounding a cavity resonator, an active laser medium displaced within said cavity resonator for producing a laser beam of a predetermined frequency, laser Q-switching means disposed within said cavity resonator including a nonlinear optical crystal disposed in the path of said laser beam and operating at the crystal phase match temperature and an analyzer for transmitting only optical energy of a selected plane of polarization, said crystal shifting the plane of polarization of the laser beam from said selected plane of polarization in response to application of a control electric field thereto to Q-switch said laser, said crystal generating a harmonic of the fundamental frequency of said laser beam in the absence of said control electric field.

2. A laser device according to claim 1 wherein said crystal provides a displacement of the plane of polarization of said fundamental and harmonic and wherein said analyzer is a prism for directing the harmonic and fundamental along different optical paths.

3. A laser device according to claim 1 wherein said harmonic is the second harmonic.

4. A laser device according to claim 2 wherein said harmonic is the second harmonic.

5. A laser device according to claim 1 wherein said crystal is of the symmetry class trigonal $3m$, said laser beam travels in the direction of the $z$-axis of said crystal and said electric field is applied along the $x$-axis of said crystal.

6. A laser device according to claim 1 wherein said crystal is of the crystal symmetry class orthorhombic $mm2$, said laser beam travels in a direction of the $x$-axis of said crystal and said electric field is applied along the $y$-axis of said crystal.

7. A laser device according to claim 5 wherein said crystal is lithium hiobate.

8. A laser device according to claim 6 wherein said crystal is barium sodium hiobate.